United States Patent
Zheng et al.

(10) Patent No.: US 12,533,627 B2
(45) Date of Patent: Jan. 27, 2026

(54) LOW-COST AND HIGH-EFFICIENCY ABSORPTION-DESORPTION DECOUPLING METHOD FOR CONTAMINANT-$CO_2$ SYNERGISTIC CAPTURE

(71) Applicants: ZHEJIANG UNIVERSITY, Hangzhou (CN); JIAXING RESEARCH INSTITUTE, ZHEJIANG UNIVERSITY, Jiaxing (CN)

(72) Inventors: Chenghang Zheng, Hangzhou (CN); Xiang Gao, Hangzhou (CN); Chang Liu, Hangzhou (CN); Can Zhou, Hangzhou (CN); Yongxin Zhang, Hangzhou (CN); You Zhang, Hangzhou (CN); Yang Zhang, Hangzhou (CN); Qinwu Li, Hangzhou (CN); Weiguo Weng, Hangzhou (CN); Weihong Wu, Hangzhou (CN); Xiao Zhang, Hangzhou (CN); Tao Wang, Hangzhou (CN)

(73) Assignees: ZHEJIANG UNIVERSITY, Hangzhou (CN); JIAXING RESEARCH INSTITUTE, ZHEJIANG UNIVERSITY, Jiaxing (CN)

( * ) Notice: Subject to any disclaimer, the term of this patent is extended or adjusted under 35 U.S.C. 154(b) by 363 days.

(21) Appl. No.: 18/120,379

(22) Filed: Mar. 11, 2023

(65) Prior Publication Data
US 2023/0285891 A1    Sep. 14, 2023

(30) Foreign Application Priority Data

Mar. 11, 2022  (CN) .......................... 202210235430.6

(51) Int. Cl.
*B01D 53/00*   (2006.01)
*B01D 15/36*   (2006.01)
(Continued)

(52) U.S. Cl.
CPC ....... *B01D 53/1412* (2013.01); *B01D 15/361* (2013.01); *B01D 47/14* (2013.01);
(Continued)

(58) Field of Classification Search
CPC .. B01D 53/1412; B01D 15/361; B01D 47/14; B01D 53/1406; B01D 53/1425;
(Continued)

(56) References Cited

U.S. PATENT DOCUMENTS

| 8,343,445 | B2 * | 1/2013 | Liu | ..................... B01D 53/1475 |
| | | | | 261/95 |
| 2008/0127831 | A1 * | 6/2008 | Rochelle | ................ B01D 3/143 |
| | | | | 95/161 |

(Continued)

*Primary Examiner* — T. Bennett Mckenzie
(74) *Attorney, Agent, or Firm* — Jiwen Chen; Joywin IP Law PLLC

(57) ABSTRACT

The invention relates to a low-cost and high-efficiency absorption-desorption decoupling method for contaminant-$CO_2$ synergistic capture. According to the method, an optimization model of absorption-desorption decoupling control for contaminant-$CO_2$ synergistic capture under different working conditions is built, the optimization objective is to obtain high-purity liquid contaminants and $CO_2$ at low cost and efficiently, and an adaptive penalty function is constructed to transform a solution of a constrained optimization problem into that of an unconstrained optimization problem, thereby controlling parameters in a real-time, precise and stable manner. Moreover, supported by means of flue gas pre-scrubbing and cooling, multi-stage intercooling and column-top demisting, the method of the present invention achieves efficient capture of contaminants and $CO_2$. According to the invention, the absorption process is decoupled from the desorption process, and the coordinated control of temperature-pH-liquid-gas ratio and rich liquid flow-desorption temperature in all cycles is carried out to realize the synergistic capture-regeneration-concentration of
(Continued)

contaminants and $CO_2$ with high efficiency and low energy consumption, thereby reducing the high cost of the traditional method where a flue gas cleaning system and a carbon capture system operate separately.

9 Claims, 3 Drawing Sheets

(51) Int. Cl.
  *B01D 47/14* (2006.01)
  *B01D 53/14* (2006.01)
  *B01D 53/18* (2006.01)
  *G05B 13/04* (2006.01)

(52) U.S. Cl.
  CPC ..... *B01D 53/1406* (2013.01); *B01D 53/1425* (2013.01); *B01D 53/1475* (2013.01); *B01D 53/185* (2013.01); *G05B 13/042* (2013.01); *B01D 2252/103* (2013.01); *B01D 2252/20421* (2013.01); *B01D 2252/20426* (2013.01); *B01D 2252/20431* (2013.01); *B01D 2252/504* (2013.01); *B01D 2258/0283* (2013.01)

(58) Field of Classification Search
  CPC .............. B01D 53/1475; B01D 53/185; B01D 2252/103; B01D 2252/20421; B01D 2252/20426; B01D 2252/20431; B01D 2252/504; B01D 2258/0283; B01D 47/10; B01D 53/18; G05B 13/042; Y02C 20/40
  USPC .......................... 95/9, 149–240; 96/243–371
  See application file for complete search history.

(56) References Cited

U.S. PATENT DOCUMENTS

| | | | | |
|---|---|---|---|---|
| 2008/0307968 | A1* | 12/2008 | Kang ..................... | B01D 53/62 95/199 |
| 2011/0067567 | A1* | 3/2011 | Kozak ................... | B01D 53/58 95/187 |
| 2012/0180521 | A1* | 7/2012 | Erickson ............... | B01D 53/62 96/242 |
| 2013/0019751 | A1* | 1/2013 | Rost ....................... | F23J 15/006 95/186 |
| 2013/0042759 | A1* | 2/2013 | Koss ..................... | B01D 53/78 95/199 |
| 2014/0116251 | A1* | 5/2014 | Bade .................. | B01D 53/1475 95/156 |
| 2014/0275693 | A1* | 9/2014 | Zink ...................... | B01D 53/18 422/255 |

* cited by examiner

LOW-COST AND HIGH-EFFICIENCY ABSORPTION-DESORPTION DECOUPLING METHOD FOR CONTAMINANT-$CO_2$ SYNERGISTIC CAPTURE

BACKGROUND OF THE INVENTION

1. Technical Field

The present invention belongs to the technical field of air pollution control and carbon emission reduction, and specifically relates to a low-cost and high-efficiency absorption-desorption decoupling method for contaminant-$CO_2$ synergistic capture.

2. Description of Related Art

Energy is the source of power for economic and social development and civilization progress. Since modern times, the large-scale development and utilization of fossil energy such as coal and oil has effectively improved the production efficiency of various countries, improved the way of life of human beings, and successively enabled dozens of countries to realize modernization. However, problems such as environmental pollution, energy shortage, and climate change have become increasingly prominent. Contaminants produced by coal combustion are one of the important causes of air pollution and global warming. Coal-fired units and industrial production consume a large amount of coal, resulting in large emissions of contaminants and carbon dioxide ($CO_2$). The smoke exhaust is generally featured with large flue gas volume and low $CO_2$ content and low partial pressure in the flue gas, resulting in high $CO_2$ capture costs. In addition, the flue gas contains acid gases such as $SO_2$, which has a bad impact on the environment.

In recent years, under the objective needs of improving regional atmospheric environment quality, promoting clean and efficient utilization of coal, and accelerating industrial transformation and upgrading, China has made significant progress in the contaminant emission control technology of coal-fired power stations. However, the large-scale carbon capture and storage (CCS) technology for $CO_2$ in coal-fired flue gas currently is facing the challenges of high investment cost, high operating cost, easy loss of absorbent/adsorbent materials, and difficulty in separation after capture, which restricts the wide-scale application of this technology. Moreover, the existing greenhouse gas control system is independent of the existing flue gas control system, which increases the complexity of the existing flue gas control system and the difficulty of operation and control. Therefore, how to realize the synergistic emission reduction of various contaminants and greenhouse gases from coal-fired boilers (especially peak-regulation units) under variable-load and variable-fuel conditions, further reduce the operating energy consumption of environmental protection devices, and improve the stability of the system under variable working conditions, is still an urgent problem to be solved.

Chinese Patent Application CN101780371A discloses a method for jointly removing $CO_2$ and $SO_2$ from flue gas, where an alkali metal carbonate loaded on a carrier, serving as a solid absorbent, and water vapor in a flue gas absorption reactor are used to jointly remove $CO_2$ and $SO_2$ to generate bicarbonates and sulfites of the alkali meta, the reacted absorbent is heated to generate the carbonate, $CO_2$ and water vapor, the generated carbonate is recycled as an absorbent, and $SO_2$ is immobilized in the alkali metal carbonate absorbent and discharged with spent materials. However, this technology has the following disadvantages: the cost of the solid absorbent is high; the regeneration temperature is as high as a temperature within a temperature of 150° C. to 300° C., and the energy consumption is high; the absorbed $SO_2$ cannot be regenerated, and sulfur resources are excessively wasted.

Chinese Patent Application CN101780371A discloses a system and method for simultaneously removing $CO_2$ and $SO_2$ from flue gas, where a water-cooled heat exchanger, a low-temperature dehumidification heat exchanger, a cold energy recovery heat exchangers and a low-temperature scrubbers are used to achieve multi-stage cooling of flue gas, thereby reducing the temperature of flue gas to below the solidification temperature of $CO_2$ and $SO_2$; multi-stage separation is implemented by using a first gas-liquid separator, a second gas-liquid separator and a solid-liquid separator; and finally solid $CO_2$ (dry ice) and liquid $SO_2$ are separated by a low-temperature fractionation system to realize the recovery of $CO_2$ and $SO_2$. However, this technology has the following disadvantages: the power consumption for cold energy recovery is high, resulting in much higher energy consumption than the traditional chemical absorption method. The condensation process will produce impurities other than $SO_2$, $CO_2$ and water vapor, resulting low product purity.

In order to reduce the high cost of the traditional method where a flue gas cleaning system and a carbon capture system operate separately, it is the most effective method to develop a novel absorbent with high absorption rate, high absorption capacity, and low desorption energy consumption. However, due to technical difficulties, a large amount of experimental accumulation is required.

Therefore, for overcoming the deficiencies in the prior art, it is urgent to research a low-cost, stable and high-efficiency, high-capture contaminant-$CO_2$ synergistic capture method.

BRIEF SUMMARY OF THE INVENTION

In order to overcome the deficiencies in the prior art, the present invention provides a low-cost and high-efficiency absorption-desorption decoupling method for contaminant-$CO_2$ synergistic capture. The method takes advantage of the high capture efficiency for contaminants and $CO_2$ and also realizes decoupling control between systems, thereby increasing the saturation of rich liquid and reducing the energy consumption of capture greatly. The process flow of the method is simple and easy to operate.

The technical solution of the present invention is as follows:

Provided is a low-cost and high-efficiency absorption-desorption decoupling method for contaminant-$CO_2$ synergistic capture, wherein flue gas enters an absorption system which includes a multi-cycle absorption column, and then enters a first-cycle contaminant absorption section, a second-cycle $CO_2$ absorption section, a third-cycle $CO_2$ absorption section and a fourth-cycle water washing section in sequence after passing through a pre-scrubbing section arranged at a front part of the multi-cycle absorption column; rich liquid enters a desorption system which includes a desorption column via a lean-rich liquid heat exchanger, and lean liquid goes out of the desorption column and enters the lean-rich liquid heat exchanger; regenerated vapor in the desorption column enters a separation and purification system; the absorption system and the desorption system are respectively controlled by a decoupling control system; the decoupling control system includes an absorption control unit for the multi-cycle absorption column and a desorption control unit for the desorption column; the absorption control unit includes a first-cycle control unit, a second-cycle control unit, a third-cycle control unit, a fourth-cycle control unit and an absorbent preparation unit;

the absorption-desorption decoupling method includes:
(1) decoupling of four cycles in the absorption system, wherein the absorption process is divided into four parts by controlling the four cycles in different areas; a first cycle corresponds to a bottom layer of the multi-cycle absorption column and is configured to absorb contaminants and be independently controlled to ensure the contaminant removal efficiency; a second cycle corresponds to a second layer of the multi-cycle absorption column and is configured to absorb $CO_2$ and be independently controlled to increase the $CO_2$ load of an absorbent; a third cycle corresponds to a third layer of the multi-cycle absorption column and is configured to absorb $CO_2$ and be independently controlled to ensure the $CO_2$ absorption efficiency; a forth cycle corresponds to a top layer of the multi-cycle absorption column and is configured to remove aerosols and be independently controlled to ensure that the emission of flue gas aerosols reaches the standard; and (2) decoupling of the absorption system and the desorption system, wherein the multi-cycle absorption is adopted so that the absorption liquid entering the desorption column is in a saturated state, thereby reducing the influence of the absorption process on the desorption;

the absorption-desorption decoupling method specifically includes the following steps:
(1) building a database based on real-time data and historical data of three-path (cooling water path, absorption liquid path and flue gas path) parameters, wherein the parameters include flue gas flow G, partial pressures $p_{out}$ and $p_{in}$ of gas in flue gas, the concentration $c_{ab}$ of an absorbent, the pH value $pH_i$, temperature $T_i$ and flow $L_i$ of liquid in a cycle, the pH value $pH_{rich}$, temperature $T_{rich}$, and flow $L_{rich}$ of rich liquid entering the desorption column, the pH value $pH_{lean}$ and temperature $T_{lean}$ of lean liquid leaving the desorption column, the concentrations, $c_{pa}$, $c_{sa}$, and $c_{ta}$ of primary amines, secondary amines, and tertiary amines in fresh absorption liquid, and the heat load W of a reboiler;

(2) building, on the basis of the built database, an optimization model of absorption-desorption decoupling control for contaminant-$CO_2$ synergistic capture under different working conditions to achieve different functions of systems and cycle sections, support optimized operation of synergistic capture in terms of capture efficiency, desorption energy consumption and overall cost; according to the actual operation of industrial carbon capture and ultra-low emission systems, setting constraints for adjustment ranges of the operating parameters as:

$\eta_{CO_2} \geq \eta_{set,CO_2}$ $\eta_{cont} \geq \eta_{set,cont}$ $G_{max} \geq G \geq G_{min}$ $p_{in,max} \geq p_{in} \geq p_{in,min}$ $c_{ab,max} \geq c_{ab} \geq c_{ab,min}$ $pH_{i,max} \geq pH_i \geq pH_{i,min}$, $i \in [1,4]$ $T_{i,max} \geq T_i \geq T_{i,min}$, $i \in [1,4]$ $L_{i,max} \geq L_i \geq L_{i,min}$, $i \in [1,4]$ wherein $\eta_{CO_2}$ and $\eta_{set,CO_2}$ represent the removal efficiency and set efficiency of $CO_2$, respectively and $\eta_{cont}$ and $\eta_{set,cont}$ represent the removal efficiency and set efficiency of a contaminant, respectively;

key parameter models for control of the first-cycle control unit, the second-cycle control unit, the third-cycle control unit, the fourth-cycle control unit, the absorbent preparation unit and the desorption control unit are:

$\eta_{1^{st}} = f_{absorbent,cont,1^{st}}(pH_1, T_1, L_1)$ $\eta_{2^{nd}} = f_{absorbent,co_2,2^{nd}}(pH_2, T_2, L_2)$ $\eta_{3^{rd}} = f_{absorbent,co_2,3^{rd}}(pH_3, T_3, L_3)$ $\eta_{4^{th}} = f_{water,4^{th}}(pH_4, T_4, L_4)$ $\eta_{absorbent} = f_{absorbent}(c_{pa}, c_{sa}, c_{ta})$ $\eta_{desorption} = f_{desorption}(L_{rich}, W)$ wherein $\eta_{1^{st}}$, $\eta_{2^{nd}}$, $\eta_{3^{rd}}$, $\eta_{4^{th}}$, $\eta_{absorbent}$ and $\eta_{desorption}$ represent efficiencies of the first-cycle control unit, the second-cycle control unit, the third-cycle control unit, the fourth-cycle control unit, the absorbent preparation unit and the desorption control unit, respectively;

an overall objective of the optimization of the absorption-desorption decoupling operation for contaminant-$CO_2$ synergistic capture is to achieve optimal cost, i.e., optimal particle fitness:

Fitness=$cost_{min}$=$cost_{1^{st}}$+$cost_{2^{nd}}$+$cost_{3^{rd}}$+$cost_{4^{th}}$+$cost_{absorbent}$+$cost_{desorption}$ wherein $cost_{1^{st}}$, $cost_{2^{nd}}$, $cost_{3^{rd}}$, $cost_{4^{th}}$, $cost_{absorbent}$, and $cost_{desorption}$ represent energy and material consumption costs of the first-cycle control unit, the second-cycle control unit, the third-cycle control unit, the fourth-cycle control unit, the absorbent preparation unit and the desorption control unit, respectively;

(3) constructing a penalty function and adding the penalty function to an objective function; transforming a solution of a constrained optimization problem into that of an unconstrained optimization problem through a penalty strategy of the objective function; and using self information and population information obtained during a particle evolution iteration process as feedback conditions to dynamically adjust a penalty coefficient of the particle fitness beyond a feasible range after each iteration;

$x \in [cost_{1^{st}}, cost_{2^{nd}}, cost_{3^{rd}}, cost_{4^{th}}, cost_{absorbent}, cost_{desorption}]$ Fitness$(x) = f(x) \cdot$ Penalty Penalty $= \lambda(t) \cdot G_p$ $G_p = 1 + \varepsilon_1 \cdot \sum_{i=1}^{m} RELU(\eta_i - \eta_{seti})^{\varepsilon_2}$ $\lambda(t) = (\mu \cdot t)^\alpha$ $(t+1) = \begin{cases} \frac{1}{\beta_1}\lambda(t), & \text{if case1} \\ \beta_2\lambda(t), & \text{if case2} \\ \lambda(t), & \text{otherwise} \end{cases}$ wherein x represents optimization objective; Penalty represents the penalty function; $\lambda$ represents adaptive factor; $G_p$ represents layered penalty coefficient (the higher the degree of constraint violation, the greater the penalty coefficient); $\eta_i$ represents the removal efficiency of a unit that is in operation; $\eta_{seti}$ represents the target efficiency of the unit that is in operation; t represents the number of iterations; $\mu$, $\varepsilon_i$, $\beta_1$ and $\beta_2$ represent scale factors of the penalty function; $\varepsilon_2$ and $\alpha$ represent power factors of the penalty function; RELU (rectified linear unit) represents an activation function judgment module and RELU(x)=max(0, x);

$\beta_1 > \beta_2 > 1$, case1 represents a case where all the optimal individuals are feasible solutions in the iteration process, and the penalty coefficient can be appropriately reduced to reduce the penalty pressure on infeasible solutions; case2 represents a case where there is no feasible solution in optimal individuals during the iteration process, and the penalty coefficient can be appropriately increased to increase the punishment for infeasible solutions; and (4) after obtaining an optimal parameter combination of first-cycle control, second-cycle control, third-cycle control, fourth-cycle control, absorbent preparation and desorption control, with the parameter combination as a control target, carrying out an advanced control method including predictive control and fuzzy control to control parameters in a real-time, precise and stable manner, thereby ensuring that the efficiency of absorption-desorption decoupling for contaminant-$CO_2$ synergistic capture reaches the standard stably and the optimal energy consumption cost can also be achieved.

The decoupling control for the absorption process and the desorption process according to the present invention takes advantage of the high efficiency of contaminant-$CO_2$ synergistic capture, and also can greatly reduce the energy consumption of the capture and regenerate and separate high-purity liquid contaminants and gaseous $CO_2$. The process flow is simple and easy to operate.

Preferably, the pre-scrubbing section is configured as a Venturi pre-scrubbing section, and the first-cycle contaminant absorption section, the second-cycle $CO_2$ absorption section, the third-cycle $CO_2$ absorption section and the fourth-cycle water washing section are connected in series from bottom to top; the first-cycle contaminant absorption section includes a first-cycle packing layer, a first-cycle nozzle and a first-cycle liquid catch tray which are arranged in sequence from bottom to top, and the first-cycle contaminant absorption section forms the first cycle through a first-cycle tank, a rich liquid pump, and a first-cycle cooler; the second-cycle $CO_2$ absorption section includes a second-cycle packing layer, a second-cycle nozzle, and a second-cycle liquid catch tray which are arranged in sequence from bottom to top, and the second-cycle $CO_2$ absorption section forms the second cycle through a second-cycle tank, a second-cycle pump, and a second-cycle cooler; the third-cycle $CO_2$ absorption section includes a third-cycle packing layer, a third-cycle nozzle, and a third-cycle liquid catch tray which are arranged in sequence from bottom to top, and the third-cycle $CO_2$ absorption section forms the third cycle through a third-cycle tank, a third-cycle pump, and a third-cycle cooler; the fourth-cycle water washing section includes a fourth-cycle packing layer and a fourth-cycle nozzle which are arranged in sequence from bottom to top, and the fourth-cycle water washing section forms the fourth cycle through a fourth-cycle tank, a fourth-cycle pump, and a fourth-cycle cooler; and an absorption column demister is arranged at the top of the multi-cycle absorption column;

the Venturi pre-scrubbing section is arranged at the front part of the multi-cycle absorption column and includes an inlet pipe, a necking pipe, a throat pipe and a diffuser pipe which are connected in sequence, a pre-scrubbing nozzle is arranged at the necking pipe, a flue gas outlet is arranged at a tail end of the diffuser pipe, the bottom of the diffuser pipe leads to a pre-scrubber water tank, and demineralized water is sprayed by the pre-scrubbing nozzle through a pre-scrubbing pump.

Preferably, an ion exchanger is arranged downstream of a lean liquid section of the lean-rich liquid heat exchanger and filled with an ion exchange resin; the third-cycle tank and the second-cycle tank are both configured as overflow liquid storage tanks arranged in steps from top to bottom; the fourth-cycle tank, the third-cycle tank, the second-cycle tank, and the first-cycle tank are each equipped with an online pH detector which can continuously monitor data and output the data through transmission to realize remote monitoring; wherein the fourth-cycle tank is configured as a demineralized water storage tank; the third-cycle tank is configured as an absorbent liquid storage tank, and when a liquid level rises to a maximum level, the liquid overflows to the second-cycle tank; the second-cycle tank is configured as an absorbent liquid storage tank, and when a liquid level rises to a maximum level, the liquid overflows to the first-cycle tank;

the fourth-cycle pump, the third-cycle pump, the second-cycle pump, and the rich liquid pump are all configured as variable-frequency pumps, and the powers thereof can be adjusted according to external signals;

cooling water of the first-cycle cooler, the second-cycle cooler, the third-cycle cooler and the fourth-cycle cooler comes from a demineralized water tank, and the cooling water after heat exchange supplements feed water of a heating boiler; cooling water sides of the first-cycle cooler, the second-cycle cooler, the third-cycle cooler, and the fourth-cycle cooler are equipped with corresponding heat-conduction flow controllers, and absorption liquid sides of the first-cycle cooler, the second-cycle cooler, and the third-cycle cooler and a demineralized water side of the fourth-cycle cooler are equipped with corresponding temperature sensors.

Preferably, the first-cycle liquid catch tray, the second-cycle liquid catch tray and the third-section liquid catch tray are all configured as low-resistance liquid catch trays, each including V-shaped diversion grooves, vent holes and partitions; the separator is spliced by two semi-elliptical plates, and a dihedral angle formed by the two semi-elliptical plates is 160°; a plurality of vent holes are provided and respectively arranged on two sides parallel to an intersection line of the two planes, 5 groups on each side; a V-shaped diversion groove is arranged above a vent hole in each group; two ends of the bottom of the V-shaped diversion groove are both welded to support columns on the vent hole; two planes of the V-shaped diversion groove form a dihedral angle of 120° and barriers under edges of the V-shaped diversion groove prevent liquid from flowing back into the vent hole.

Preferably, the desorption column includes a reboiler, a desorption column packing layer, and a desorption column nozzle which are arranged in sequence from bottom to top, and a desorption column demister is arranged at the top of the desorption column;

the reboiler is configured as a vertical tube-side thermosiphon reboiler which includes a heat collecting tube plate and a middle machine body; the heat collecting tube is installed and fixed on an inner side of the middle machine body; a boiling process takes place in a tube side, and a heating medium is in a shell side; a two-phase flow mixture flows from a discharge pipe into the desorption column at a high flow rate;

a liquid baffle and an overflow plate are arranged at the bottom of the desorption column, the liquid baffle is arranged above the overflow plate and fixed on a column wall to prevent liquid in the desorption column from flowing out of the desorption column without passing through the reboiler, and an upper edge of the overflow plate is slightly higher than the heat collecting tube of the reboiler;

a multi-cycle absorption column is connected to the desorption column through the lean-rich liquid heat exchanger; the lean-rich liquid heat exchanger is configured as a spiral plate heat exchanger; the lean liquid and the rich liquid flow in the heat exchanger in a complete countercurrent manner; flanges on two end surfaces of a spiral channel are closed by welding in a staggered manner and end surface sealing adopts a sealing structure including a top cover and a gasket; the rich liquid in the first-cycle tank of the multi-cycle absorption column passes through the rich liquid pump and enters the lean-rich liquid heat exchanger for heat exchange, and then communicates with the desorption column nozzle of the desorption column; the lean liquid at the bottom of the desorption column passes through a lean liquid pump and enters the lean-rich liquid heat exchanger for heat exchange, then enters the ion exchanger for ion exchange, and then communicates with the third-cycle cooler to enter the third cycle; the lean liquid pump is configured as a variable-frequency pump.

Preferably, the separation and purification system includes a cooler, a gas-liquid separator and a low-temperature gas-liquid separator, and the cooler, the gas-liquid separator and the low-temperature gas-liquid separator are connected in sequence; cooling water of the cooler comes from the demineralized water tank; the gas-liquid separator separates water vapor from the flue gas, the cooled flue gas enters the gas-liquid separator, condensed water flows back into the desorption column from the bottom of the gas-liquid separator, and the flue gas after the separation leaves from the top of the gas-liquid separator; the low-temperature gas-liquid separator separates contaminants and $CO_2$ in the flue gas, and the low-temperature gas-liquid separator uses a cooling medium to reduce the temperature of the flue gas to below the boiling point of the contaminants; contaminants in the flue gas are condensed and then recovered from the bottom of the low-temperature gas-liquid separator, and $CO_2$ gas is recovered from the top of the low-temperature gas-liquid separator.

Preferably, the first-cycle control unit is respectively connected with the first-cycle tank, the rich liquid pump and the first-cycle cooler to independently control the first cycle; the first-cycle control unit respectively controls the pH value of the absorption liquid in the first-cycle tank, the liquid flow of the rich liquid pump, and the cooling water flow of the first-cycle cooler; in the first cycle, the pH value is maintained between 4.5 and 5.8, the liquid-gas ratio is maintained between 1.5 L/m$^3$ and 2.0 L/m$^3$, and the absorption temperature is maintained between 48° C. and 60° C.;

the second-cycle control unit is respectively connected with the second-cycle tank, the second-cycle pump and the second-cycle cooler to independently control the second cycle; the second-cycle control unit respectively controls the pH value of the absorption liquid in the second-cycle tank, the liquid flow of the second-cycle pump, and the cooling water flow of the second-cycle cooler; in the second cycle, the pH value is maintained between 7.8 and 9.0, the liquid-gas ratio is maintained between 1.1 L/m$^3$ and 1.4 L/m$^3$, and the absorption temperature is maintained between 44° C. and 55° C.;

the third-cycle control unit is respectively connected with the third-cycle tank, the third-cycle pump and the third-cycle cooler to independently control the third cycle; the third-cycle control unit respectively controls the pH value of the absorption liquid in the third-cycle tank, the liquid flow of the third-cycle pump, and the cooling water flow of the third-cycle cooler; in the third cycle, the pH value is maintained between 9.0 and 10.5, the liquid-gas ratio is maintained between 1.0 L/m$^3$ and 1.3 L/m$^3$, and the absorption temperature is maintained between 40° C. and 50° C.;

the fourth-cycle control unit is respectively connected with the fourth-cycle tank, the fourth-cycle pump and the fourth-cycle cooler to independently control the fourth cycle; the fourth-cycle control unit respectively controls the pH value of demineralized water in the fourth-cycle tank, the liquid flow of the fourth-cycle pump, and the cooling water flow of the fourth-cycle cooler; in the fourth cycle, the pH value is maintained between 8.5 and 9.8, the liquid-gas ratio is maintained between 0.6 L/m$^3$ and 1.0 L/m$^3$, and the absorption temperature is maintained between 40° C. and 50° C.

Preferably, the absorbent preparation unit provides a fresh absorbent for the third-cycle tank, and adjusts a mixing ratio of primary amines, secondary amines, and tertiary amines to match the absorption process according to the requirements for absorption capacity and absorption rate.

Preferably, the desorption control unit is respectively connected to the reboiler and an inlet pipeline of the desorption column to independently control the desorption system; the desorption control unit detects the pH value and temperature of the absorbent at an inlet of the desorption column and the pH value and temperature of the absorbent at an outlet of the reboiler to respectively control the heat load of the reboiler and the flow of the rich liquid at the inlet of the desorption column, and the pH difference between lean and rich liquid inlets and outlets of the desorption system is maintained between 4.8 and 5.8, and can be flexibly adjusted according to the $CO_2$ concentration of the flue gas.

Compared with the prior art, the present invention has the following beneficial effects:

1. An optimization model of absorption-desorption decoupling control for contaminant-$CO_2$ synergistic capture under different working conditions is built on the basis of the database of real-time data and historical data, and an adaptive penalty function is constructed to transform a solution of a constrained optimization problem into that of an unconstrained optimization problem, thereby controlling parameters in a real-time, precise and stable manner and ensuring that the efficiency of absorption-desorption decoupling for contaminant-$CO_2$ synergistic capture reaches the standard stably and the optimal energy consumption cost can also be achieved. When the contaminant removal efficiency reaches 99% and the $CO_2$ removal efficiency reaches 90%, the desorption energy consumption is less than 2.7 GJ/t $CO_2$.

2. The four-cycle decoupling control for the absorption system realizes the independent controllability of the temperature and pH of the absorbent and the gas-liquid ration in each cycle. The first cycle realizes independent control of contaminant removal to ensure contaminant absorption efficiency. The second cycle realizes the independent control of $CO_2$ absorption (high-concentration area) to ensure the saturated absorption of $CO_2$. The third cycle realizes independent control of $CO_2$ absorption (low-concentration area) to ensure $CO_2$ absorption efficiency and absorption capacity. The fourth cycle realizes the independent control of the aerosol removal process and can prevent aerosol from escaping and assist in capturing low-concentration $CO_2$ by misting fine water mist.

3. In the decoupling control for the desorption system and the absorption system, by respectively controlling the heat load of the reboiler and the rich liquid flow rate at the inlet of the desorption column, it is ensured that the absorbent entering the desorption column can reach absorption saturation under variable working conditions. Moreover, according to the pH difference between the inlet and outlet of the desorption column, the dose of the absorbent entering into the desorption column can be flexibly adjusted to ensure the maximum output of pure gaseous contaminants and $CO_2$ and the low energy consumption of synergistic capture.

4. The contaminant-$CO_2$ absorption system adopts flue gas pre-scrubbing and cooling, multi-stage intercooling and column-top demisting technologies, and also realizes control by different areas and multi-cycle absorption. The four cycles are carried out for aerosol removal, efficient $CO_2$ absorption, improvement of $CO_2$ saturation of the absorbent and efficient contaminant removal in sequence from top to bottom. Compared with the traditional and ultra-low emission system operating independently from a post-combustion $CO_2$ capture device, the system of the present invention requires low energy consumption and low operating costs and achieves the $CO_2$ capture rate of 90% or above and the contaminant removal efficiency of 99% or above.

5. According to the requirements for absorption capacity and absorption rate, the absorbent preparation unit selects an absorbent formula in full consideration of absorption rate, absorption capacity and absorption enthalpy to match the absorption process, thus realizing the independent controllability of the absorption rate and absorption capacity, ensuring the absorption efficiency and reducing desorption energy consumption.

DESCRIPTION OF REFERENCE NUMERALS IN THE FIGURES

Figure 1:
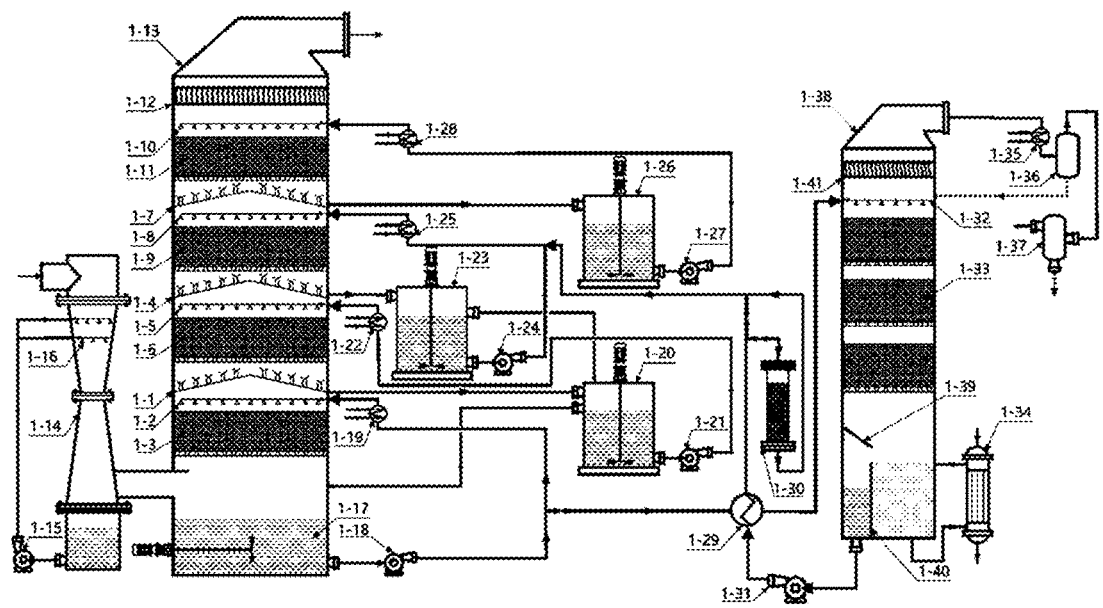
FIG. 1 is a schematic structural diagram of an absorption-desorption decoupling system according to the inventive method.
Figure 2:
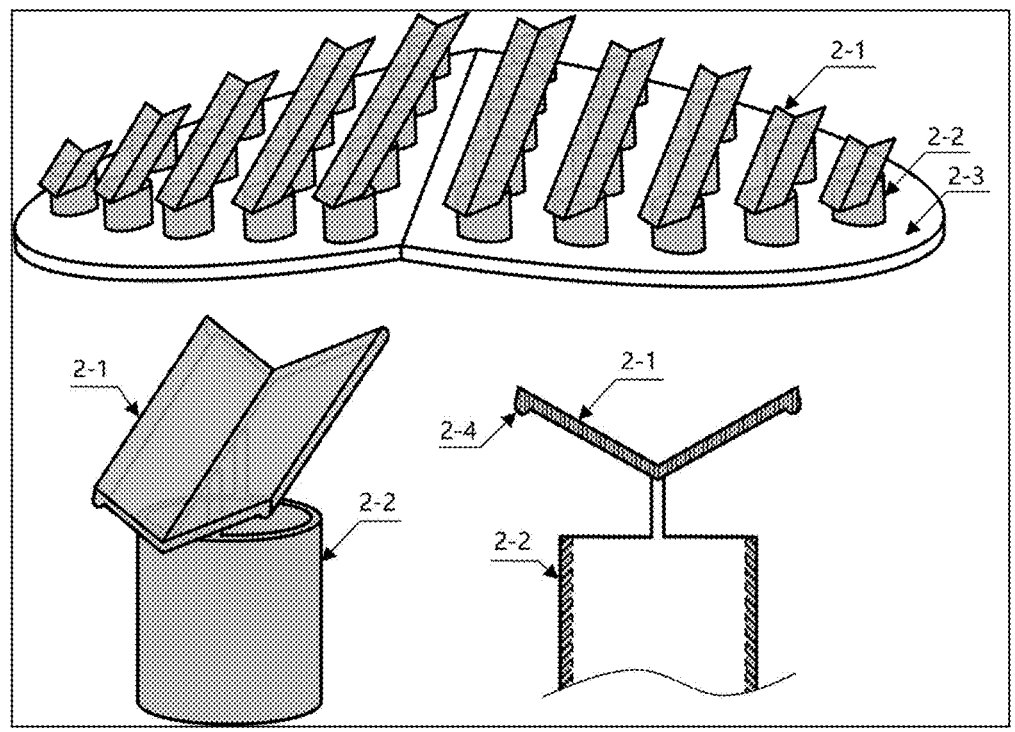
FIG. 2 is a schematic structural diagram of a low-resistance liquid catch tray according to the present invention.

In FIG. 1, 1-1, first-cycle liquid catch tray; 1-2, first-cycle nozzle; 1-3, first-cycle packing layer; 1-4, second-cycle liquid catch tray; 1-5, second-cycle nozzle; 1-6, second-cycle packing layer; 1-7, third-cycle liquid catch tray; 1-8, third-cycle nozzle; 1-9, third-cycle packing layer; 1-10, fourth-cycle nozzle; 1-11, fourth-cycle packing layer; 1-12, absorption column demister; 1-13, multi-cycle absorption column; 1-14, Venturi pre-scrubbing section; 1-15, pre-scrubbing pump; 1-16, pre-scrubbing nozzle; 1-17, first-cycle tank; 1-18, rich liquid pump; 1-19, first-cycle cooler; 1-20, second-cycle tank; 1-21, second-cycle pump; 1-22, second-cycle cooler; 1-23, third-cycle tank; 1-24, third-cycle pump; 1-25, third-cycle cooler; 1-26, fourth-cycle tank; 1-27, fourth-cycle pump; 1-28, fourth-cycle cooler; 1-29, lean-rich liquid heat exchanger; 1-30, ion exchanger; 1-31, lean liquid pump; 1-32, desorption column nozzle; 1-33, desorption column packing layer; 1-34, reboiler; 1-35, cooler; 1-36, gas-liquid separator; 1-37, low-temperature gas-liquid separator; 1-38, desorption column; 1-39, liquid baffle; 1-40, overflow plate; and 1-41, desorption column demister;

In FIG. 2, 2-1. V-shaped diversion groove; 2-2. vent hole; 2-3. partition; and 2-4. barrier.

DETAILED DESCRIPTION OF THE INVENTION

The present invention disclosure will be further described below in conjunction with specific embodiments, but the scope of the invention is not limited to the embodiments. Those skilled in the art can and should know that any simple changes or substitutions based on the essence and spirit of the present invention shall fall within the scope claimed by the present invention.

Embodiment 1

Figure 3:
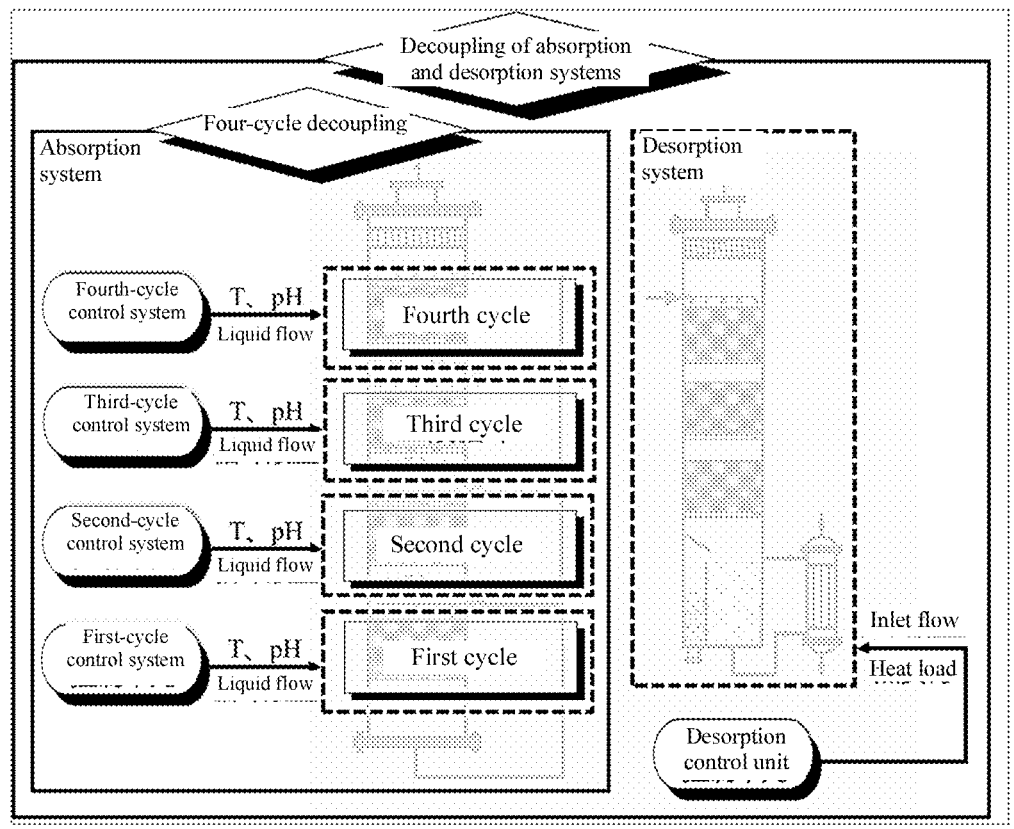
FIG. 3 is a process flow diagram according to the present invention.

Referring to FIGS. 1-3, illustrated is a low-cost and high-efficiency absorption-desorption decoupling method for contaminant-$CO_2$ synergistic capture, wherein flue gas enters an absorption system which includes a multi-cycle absorption column, and then enters a first-cycle contaminant absorption section, a second-cycle $CO_2$ absorption section, a third-cycle $CO_2$ absorption section and a fourth-cycle water washing section in sequence after passing through a pre-scrubbing section arranged at a front part of the multi-cycle absorption column; rich liquid enters a desorption system which includes a desorption column via a lean-rich liquid heat exchanger, and lean liquid goes out of the desorption column and enters the lean-rich liquid heat exchanger; regenerated vapor in the desorption column enters a separation and purification system; the absorption system and the desorption system are respectively controlled by a decoupling control system; the decoupling control system includes an absorption control unit for the multi-cycle absorption column and a desorption control unit for the desorption column; the absorption control unit includes a first-cycle control unit, a second-cycle control unit, a third-cycle control unit, a fourth-cycle control unit and an absorbent preparation unit.

The absorption-desorption decoupling method includes:

(1) Decoupling of four cycles in the absorption system. The absorption process is divided into four parts by controlling the four cycles in different areas; a first cycle corresponds to a bottom layer of the multi-cycle absorption column 1-13 and is configured to absorb contaminants and be independently controlled to ensure the contaminant removal efficiency; a second cycle corresponds to a second layer of the multi-cycle absorption column 1-13 and is configured to absorb $CO_2$ and be independently controlled to increase the $CO_2$ load of an absorbent; a third cycle corresponds to a third layer of the multi-cycle absorption column 1-13 and is configured to absorb $CO_2$ and be independently controlled to ensure the $CO_2$ absorption efficiency; a forth cycle corresponds to a top layer of the multi-cycle absorption column 1-13 and is configured to remove aerosols and be independently controlled to ensure that the emission of flue gas aerosols reaches the standard. In a traditional absorption process, the absorption column is not divided in different areas and parameters are changed continuously along with the entire absorption area. However, by adoption of the method of multi-cycle absorption in different areas, the areas of the multi-cycle absorption column 1-13 can be controlled separately to achieve different functions, which can accurately control the absorption process.

(2) Decoupling of the absorption system and the desorption system. In a traditional capture-regeneration process, the absorbent absorbs acid gas once and then directly enters the desorption column for desorption. $CO_2$ desorption and desorption heat load depend on the absorption capacity and absorption reaction conditions. The $CO_2$ desorption and the desorption heat load have an effect on each other and are highly coupled. However, by adoption of the multi-cycle absorption, the absorption liquid entering the desorption column 1-38 is in a saturated state and the desorption performance of the desorption column 1-38 is only related to the flow of the absorption liquid entering the desorption column 1-38 and the heat load of the reboiler 1-34, thereby reducing the influence of the absorption process on the desorption.

The absorption-desorption decoupling method specifically includes the following steps:

(1) building a database based on real-time data and historical data of three-path (cooling water path, absorption liquid path and flue gas path) parameters, wherein the parameters include flue gas flow G, partial pressures $p_{out}$ and $p_{in}$ of gas in the flue gas, the concentration $c_{ab}$ of the absorbent, the pH value $pH_i$, temperature $T_i$ and flow $L_i$ of liquid in a cycle, the pH value $pH_{rich}$, temperature $T_{rich}$, and flow $L_{rich}$ of rich liquid entering the desorption column, the pH value $pH_{lean}$ and temperature $T_{lean}$ of lean liquid leaving the desorption column, the concentrations, $c_{pa}$, $c_{sa}$ and $c_{ta}$ of primary amines, secondary amines, and tertiary amines in fresh absorption liquid, and the heat load W of the reboiler;

(2) building, on the basis of the built database, an optimization model of absorption-desorption decoupling control for contaminant-$CO_2$ synergistic capture under different working conditions to achieve different functions of systems and cycle sections, support optimized operation of synergistic capture in terms of capture efficiency, desorption energy consumption and overall cost; according to the actual operation of industrial carbon capture and ultra-low emission systems, setting constraints for adjustment ranges of the operating parameters as:

$$\eta_{CO_2} \geq \eta_{set,CO_2}$$

$$\eta_{cont} \geq \eta_{set,cont}$$

$$G_{max} \geq G \geq G_{min}$$

$$p_{in,max} \geq p_{in} \geq p_{in,min}$$

$$c_{ab,max} \geq c_{ab} \geq c_{ab,min}$$

$$pH_{i,max} \geq pH_i \geq pH_{i,min}, \; i \in [1,4]$$

$$T_{i,max} \geq T_i \geq T_{i,min}, \; i \in [1,4]$$

$$L_{i,max} \geq L_i \geq L_{i,min}, \; i \in [1,4]$$

wherein $\eta_{CO_2}$ and $\eta_{set,CO_2}$ represent the removal efficiency and set efficiency of $CO_2$, respectively and $\eta_{cont}$ and $\eta_{set,cont}$ represent the removal efficiency and set efficiency of a contaminant, respectively;

key parameter models for control of the first-cycle control unit, the second-cycle control unit, the third-cycle control unit, the fourth-cycle control unit, the absorbent preparation unit and the desorption control unit are:

$$\eta_{1^{st}} = f_{absorbent,cont,1^{st}}(pH_1, T_1, L_1)$$

$$\eta_{2^{nd}} = f_{absorbent,co_2,2^{nd}}(pH_2, T_2, L_2)$$

$$\eta_{3^{rd}} = f_{absorbent,co_2,3^{rd}}(pH_3, T_3, L_3)$$

$$\eta_{4^{th}} = f_{water,4^{th}}(pH_4, T_4, L_4)$$

$$\eta_{absorbent} = f_{absorbent}(c_{pa}, c_{sa}, c_{ta})$$

$$\eta_{desorption} = f_{desorption}(L_{rich}, W)$$

wherein $\eta_{1^{st}}$, $\eta_{2^{nd}}$, $\eta_{3^{rd}}$, $\eta_{4^{th}}$, $\eta_{absorbent}$ and $\eta_{desorption}$ represent efficiencies of the first-cycle control unit, the second-cycle control unit, the third-cycle control unit, the fourth-cycle control unit, the absorbent preparation unit and the desorption control unit, respectively;

an overall objective of the optimization of the absorption-desorption decoupling operation for contaminant-$CO_2$ synergistic capture is to achieve optimal cost, i.e., optimal particle fitness:

$$\text{Fitness} = \text{cost}_{min} = \text{cost}_{1^{st}} + \text{cost}_{2^{nd}} + \text{cost}_{3^{rd}} + \text{cost}_{4^{th}} + \text{cost}_{absorbent} + \text{cost}_{desorption}$$

wherein $\text{cost}_{1^{st}}$, $\text{cost}_{2^{nd}}$, $\text{cost}_{3^{rd}}$, $\text{cost}_{4^{th}}$, $\text{cost}_{absorbent}$, and $\text{cost}_{desorption}$ represent energy and material consumption costs of the first-cycle control unit, the second-cycle control unit, the third-cycle control unit, the fourth-cycle control unit, the absorbent preparation unit and the desorption control unit, respectively;

(3) constructing a penalty function and adding the penalty function to an objective function; transforming a solution of a constrained optimization problem into that of an unconstrained optimization problem through a penalty strategy of the objective function; and using self information and population information obtained during a particle evolution iteration process as feedback conditions to dynamically adjust a penalty coefficient of the particle fitness beyond a feasible range after each iteration;

$$x \in \left[ \text{cost}_{1^{st}}, \text{cost}_{2^{nd}}, \text{cost}_{3^{rd}}, \text{cost}_{4^{th}}, \text{cost}_{absorbent}, \text{cost}_{desorption} \right]$$

$$\text{Fitness}(x) = f(x) \cdot \text{Penalty}$$

$$\text{Penalty} = \lambda(t) \cdot G_p$$

$$G_p = 1 + \varepsilon_1 \cdot \sum_{i=1}^{m} RELU(\eta_i - \eta_{seti})^{\varepsilon_2}$$

$$\lambda(t) = (\mu \cdot t)^{\alpha}$$

$$(t+1) = \begin{cases} \frac{1}{\beta_1}\lambda(t), & \text{if case1} \\ \beta_2\lambda(t), & \text{if case2} \\ \lambda(t), & \text{otherwise} \end{cases}$$

wherein x represents optimization objective; Penalty represents the penalty function; λ represents adaptive factor, $G_p$ represents layered penalty coefficient (the higher the degree of constraint violation, the greater the penalty coefficient); $\eta_i$ represents the removal efficiency of a unit that is in operation; $\eta_{seti}$ represents the target efficiency of the unit that is in operation; t represents the number of iterations; μ, $\varepsilon_1$, $\beta_1$ and $\beta_2$ represent scale factors of the penalty function; $\varepsilon_2$ and α represent power factors of the penalty function; RELU (rectified linear unit) represents an activation function judgment module and RELU(x)=max(0, x);

$\beta_1 > \beta_2 > 1$, case1 represents a case where all the optimal individuals are feasible solutions in the iteration process, and the penalty coefficient can be appropriately reduced to reduce the penalty pressure on infeasible solutions; case2 represents a case where there is no feasible solution in optimal individuals during the iteration process, and the penalty coefficient can be appropriately increased to increase the punishment for infeasible solutions; and (4) after obtaining an optimal parameter combination of first-cycle control, second-cycle control, third-cycle control, fourth-cycle control, absorbent preparation and desorption control, with the parameter combination as a control target, carrying out an advanced control method including predictive control and fuzzy control to control parameters in a real-time, precise and stable manner, thereby ensuring that the efficiency of absorption-desorption decoupling for contaminant-$CO_2$ synergistic capture reaches the standard stably and the optimal energy consumption cost can also be achieved.

An absorption-desorption decoupling system constructed based on the above method includes an absorption system, a desorption system, a separation and purification system and a decoupling control system.

The absorption system includes a multi-cycle absorption column 1-13 and an ion exchanger 1-30. The multi-cycle absorption column 1-13 includes a Venturi pre-scrubbing section 1-14, a first-cycle contaminant absorption section, a second-cycle $CO_2$ absorption section, a third-cycle $CO_2$ absorption section and a fourth-cycle water washing section. The first-cycle contaminant absorption section, the second-cycle $CO_2$ absorption section, the third-cycle $CO_2$ absorption section and the fourth-cycle water washing section are connected in series from bottom to top. The first-cycle contaminant absorption section includes a first-cycle packing layer 1-3, a first-cycle nozzle 1-2 and a first-cycle liquid catch tray 1-1 which are arranged in sequence from bottom to top, and the first-cycle contaminant absorption section forms the first cycle through a first-cycle tank 1-17, a rich liquid pump 1-18, and a first-cycle cooler 1-19. The second-cycle $CO_2$ absorption section includes a second-cycle packing layer 1-6, a second-cycle nozzle 1-5, and a second-cycle liquid catch tray 1-4 which are arranged in sequence from bottom to top, and the second-cycle $CO_2$ absorption section forms the second cycle through a second-cycle tank 1-20, a second-cycle pump 1-21, and a second-cycle cooler 1-22; the third-cycle $CO_2$ absorption section includes a third-cycle packing layer 1-9, a third-cycle nozzle 1-8, and a third-cycle liquid catch tray 1-7 which are arranged in sequence from bottom to top, and the third-cycle $CO_2$ absorption section forms the third cycle through a third-cycle tank 1-23, a third-cycle pump 1-24, and a third-cycle cooler 1-25; the fourth-cycle water washing section includes a fourth-cycle packing layer 1-11 and a fourth-cycle nozzle 1-10 which are arranged in sequence from bottom to top, and the fourth-cycle water washing section forms the fourth cycle through a fourth-cycle tank 1-26, a fourth-cycle pump 1-27, and a fourth-cycle cooler 1-28; and an absorption column demister 1-12 is arranged at the top of the multi-cycle absorption column 1-13.

The Venturi pre-scrubbing section 1-14 is arranged at the front part of the multi-cycle absorption column 1-13 and includes an inlet pipe, a necking pipe, a throat pipe and a diffuser pipe which are connected in sequence. A pre-scrubbing nozzle 1-16 is arranged at the necking pipe. A flue gas outlet is arranged at a tail end of the diffuser pipe. The bottom of the diffuser pipe leads to a pre-scrubber water tank. Demineralized water is sprayed by the pre-scrubbing nozzle through a pre-scrubbing pump 1-15.

The ion exchanger 1-30 is arranged downstream of a lean liquid section of the lean-rich liquid heat exchanger 1-29 and filled with an ion exchange resin.

The third-cycle tank 1-23 and the second-cycle tank 1-20 are both configured as overflow liquid storage tanks arranged in steps from top to bottom. The fourth-cycle tank 1-26, the third-cycle tank 1-23, the second-cycle tank 1-20, and the first-cycle tank 1-17 are each equipped with an online pH detector which can continuously monitor data and output the data through transmission to realize remote monitoring. The fourth-cycle tank 1-26 is configured as a demineralized water storage tank. The third-cycle tank 1-23 is configured as an absorbent liquid storage tank, and when a liquid level rises to a maximum level, the liquid overflows to the second-cycle tank 1-20. The second-cycle tank 1-20 is configured as an absorbent liquid storage tank, and when a liquid level rises to a maximum level, the liquid overflows to the first-cycle tank 1-17.

The fourth-cycle pump 1-27, the third-cycle pump 1-24, the second-cycle pump 1-21, and the rich liquid pump 1-18 are all configured as variable-frequency pumps, and the powers thereof can be adjusted according to external signals.

Cooling water of the first-cycle cooler 1-19, the second-cycle cooler 1-22, the third-cycle cooler 1-25 and the fourth-cycle cooler 1-28 comes from a demineralized water tank, and the cooling water after heat exchange supplements feed water of a heating boiler. Cooling water sides of the first-cycle cooler 1-19, the second-cycle cooler 1-22, and the third-cycle cooler 1-25 are equipped with corresponding heat-conduction flow controllers, and absorption liquid sides of the first-cycle cooler 1-19, the second-cycle cooler 1-22, and the third-cycle cooler 1-25 are equipped with corresponding temperature sensors. A cooling water side of the fourth-cycle cooler 1-28 is equipped with a heat-conduction flow controller and a demineralized water side thereof is equipped with a temperature sensor.

The desorption system includes the desorption column 1-38 and the lean-rich liquid heat exchanger 1-29. The desorption column includes a reboiler 1-34, a desorption column packing layer 1-33, and a desorption column nozzle 1-32 which are arranged in sequence from bottom to top, and a desorption column demister 1-41 is arranged at the top of the desorption column.

The reboiler 1-34 is configured as a vertical tube-side thermosiphon reboiler which includes a heat collecting tube plate and a middle machine body. The heat collecting tube is installed and fixed on an inner side of the middle machine body. A boiling process takes place in a tube side, and a heating medium is in a shell side. A two-phase flow mixture flows from a discharge pipe into the desorption column at a high flow rate.

A liquid baffle 1-39 and an overflow plate 1-40 are arranged at the bottom of the desorption column 1-38. The liquid baffle 1-39 is arranged above the overflow plate 1-40 and fixed on a column wall to prevent the liquid in the desorption column 1-38 from flowing out of the desorption column without passing through the reboiler 1-34. An upper edge of the overflow plate 1-40 is slightly higher than the heat collecting tube of the reboiler 1-34.

The lean-rich liquid heat exchanger 1-29 is configured as a spiral plate heat exchanger. The lean liquid and the rich liquid flow in the heat exchanger 1-29 in a complete countercurrent manner. Flanges on two end surfaces of a spiral channel are closed by welding in a staggered manner and end surface sealing adopts a sealing structure including a top cover and a gasket. The lean-rich liquid heat exchanger 1-29 connects the multi-cycle absorption column 1-13 and the desorption column 1-38. The rich liquid in the first-cycle tank 1-17 of the multi-cycle absorption column 1-13 passes through the rich liquid pump 1-18 and enters the lean-rich liquid heat exchanger 1-29 for heat exchange, and then communicates with the desorption column nozzle 1-32 of the desorption column 1-38. The lean liquid at the bottom of the desorption column 1-38 passes through a lean liquid pump 1-31 and enters the lean-rich liquid heat exchanger 1-29 for heat exchange, then enters the ion exchanger 1-30 for ion exchange, and then communicates with the third-cycle cooler 1-25 to enter the third cycle. The lean liquid pump 1-31 is configured as a variable-frequency pump.

The separation and purification system includes a cooler 1-35, a gas-liquid separator 1-36 and a low-temperature gas-liquid separator 1-37, and the cooler 1-35, the gas-liquid separator 1-36 and the low-temperature gas-liquid separator 1-37 are connected in sequence; cooling water of the cooler 1-35 comes from the demineralized water tank. Cooled flue gas enters the gas-liquid separator 1-36, condensed water flows back into the desorption column 1-38 from the bottom of the gas-liquid separator 1-36, and the flue gas after the separation leaves from the top of the gas-liquid separator 1-36. The flue gas then enters the low-temperature gas-liquid separator 1-37. The low-temperature gas-liquid separator 1-37 uses a cooling medium to reduce the temperature of the flue gas to below the boiling point of the contaminants. Contaminants in the flue gas are condensed and then recovered from the bottom of the low-temperature gas-liquid separator 1-37, and $CO_2$ gas is recovered from the top of the low-temperature gas-liquid separator 1-37.

Preferably, liquid catch trays of the absorption column are all configured as low-resistance liquid catch trays, each including V-shaped diversion grooves 2-1, vent holes 2-2 and partitions 2-3. The partition 2-3 is spliced by two semi-elliptical plates, and a dihedral angle formed by the two semi-elliptical plates is 160°. A plurality of vent holes 2-2 are provided and respectively arranged on two sides parallel to an intersection line of the two planes, 5 groups on each side. A V-shaped diversion groove is arranged above a vent hole 2-2 in each group. Two ends of the bottom of the V-shaped diversion groove 2-1 are both welded to support columns on the vent hole 2-2. Two planes of the V-shaped diversion groove form a dihedral angle of 120° and barriers 2-4 under edges of the V-shaped diversion groove prevent liquid from flowing back into the vent hole 2-2.

Embodiment 2

In addition to $N_2$ and some $O_2$, flue gas from power plants burning high-sulfur coal also contains about 10% of water vapor, 12-18% of $CO_2$, 1000-1500 ppm of $SO_2$ and the like.

The first-cycle control unit is respectively connected with the first-cycle tank 1-17, the rich liquid pump 1-18 and the first-cycle cooler 1-19 to independently control the first cycle The first-cycle control unit respectively controls the pH value of the absorption liquid in the first-cycle tank 1-17, the liquid flow of the rich liquid pump 1-18, and the cooling water flow of the first-cycle cooler 1-19, and it is ensured that in the first cycle, the pH value is 5.2, the liquid-gas ratio is 1.8 $L/m^3$, and the absorption temperature is 54° C.

The second-cycle control unit is respectively connected with the second-cycle tank 1-20, the second-cycle pump 1-21 and the second-cycle cooler 1-22 to independently control the second cycle. The second-cycle control unit respectively controls the pH value of the absorption liquid in the second-cycle tank 1-20, the liquid flow of the second-cycle pump 1-21, and the cooling water flow of the second-cycle cooler 1-22, and it is ensured that in the second cycle, the pH value is 8.4, the liquid-gas ratio is 1.3 $L/m^3$, and the absorption temperature is 50° C.

The third-cycle control unit is respectively connected with the third-cycle tank 1-23, the third-cycle pump 1-24 and the third-cycle cooler 1-25 to independently control the third cycle. The third-cycle control unit respectively controls the pH value of the absorption liquid in the third-cycle tank 1-23, the liquid flow of the third-cycle pump 1-24, and the cooling water flow of the third-cycle cooler 1-25, and it is ensured that in the third cycle, the pH value is 9.8, the liquid-gas ratio is 1.2 $L/m^3$, and the absorption temperature is 45° C.

The fourth-cycle control unit is respectively connected with the fourth-cycle tank 1-26, the fourth-cycle pump 1-27 and the fourth-cycle cooler 1-28 to independently control the fourth cycle. The fourth-cycle control unit respectively controls the pH value of demineralized water in the fourth-cycle tank 1-26, the liquid flow of the fourth-cycle pump 1-27, and the cooling water flow of the fourth-cycle cooler 1-28, and it is ensured that in the fourth cycle, the pH value is 9.2, the liquid-gas ratio is 0.8 $L/m^3$, and the absorption temperature is 45° C.

The absorbent preparation unit provides a fresh absorbent for the third-cycle tank 1-23 as required. For power plants burning high-sulfur coal, secondary amines with relatively balanced absorption rate and absorption capacity are mixed with primary amines with a high absorption rate at a ratio of 3:1.

The desorption control unit is respectively connected to the reboiler 1-34 and an inlet pipeline of the desorption column 1-38 to independently control the desorption system. The desorption control unit detects the pH value and temperature of the absorbent at the inlet of the desorption column 1-38 and the pH value and temperature of the absorbent at the outlet of the reboiler 1-34 to respectively control the heat load of the reboiler 1-34 and the flow of the rich liquid at the inlet of the desorption column 1-38, and it is ensured that the pH difference between lean and rich liquid inlets and outlets of the desorption system is maintained at 5.3 and can be flexibly adjusted according to the $CO_2$ concentration of the flue gas.

Figure 4:
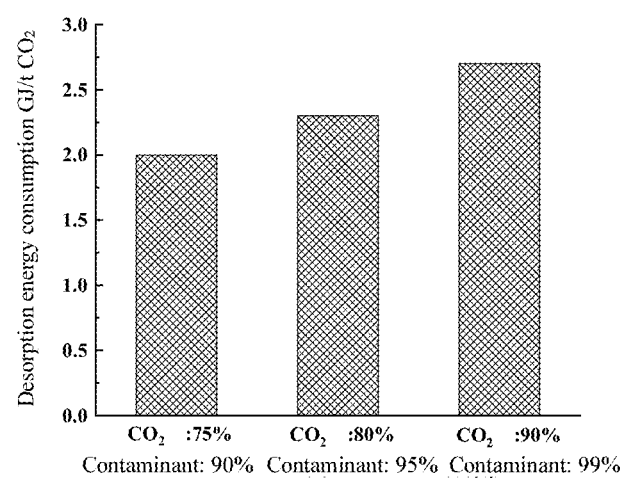
FIG. 4 is a histogram of desorption energy consumption under different removal efficiencies according to Embodiment 2 of the present invention.

FIG. 4 illustrates comparison of desorption energy consumption under different contaminant and $CO_2$ removal efficiencies. The results show that with the continuous improvement of contaminant and $CO_2$ removal efficiency, the required desorption energy consumption is also increased continuously. When the contaminant removal efficiency reaches 99% and the $CO_2$ removal efficiency reaches 90%, the desorption energy consumption is 2.7 GJ/t $CO_2$.

Embodiment 3

In addition to $N_2$ and some $O_2$, flue gas from iron and steel plants contains about 5-8% of water vapor, 15-25% of $CO_2$, 2500-4000 ppm of $SO_2$ and the like.

The first-cycle control unit is respectively connected with the first-cycle tank 1-17, the rich liquid pump 1-18 and the first-cycle cooler 1-19 to independently control the first cycle The first-cycle control unit respectively controls the pH value of the absorption liquid in the first-cycle tank 1-17, the liquid flow of the rich liquid pump 1-18, and the cooling water flow of the first-cycle cooler 1-19, and it is ensured that in the first cycle, the pH value is 4.5, the liquid-gas ratio is 2.0 L/m³, and the absorption temperature is 58° C.

The second-cycle control unit is respectively connected with the second-cycle tank 1-20, the second-cycle pump 1-21 and the second-cycle cooler 1-22 to independently control the second cycle. The second-cycle control unit respectively controls the pH value of the absorption liquid in the second-cycle tank 1-20, the liquid flow of the second-cycle pump 1-21, and the cooling water flow of the second-cycle cooler 1-22, and it is ensured that in the second cycle, the pH value is 8.2, the liquid-gas ratio is 1.4 L/m³, and the absorption temperature is 52° C.

The third-cycle control unit is respectively connected with the third-cycle tank 1-23, the third-cycle pump 1-24 and the third-cycle cooler 1-25 to independently control the third cycle. The third-cycle control unit respectively controls the pH value of the absorption liquid in the third-cycle tank 1-23, the liquid flow of the third-cycle pump 1-24, and the cooling water flow of the third-cycle cooler 1-25, and it is ensured that in the third cycle, the pH value is 9.4, the liquid-gas ratio is 1.1 L/m³, and the absorption temperature is 48° C.

The fourth-cycle control unit is respectively connected with the fourth-cycle tank 1-26, the fourth-cycle pump 1-27 and the fourth-cycle cooler 1-28 to independently control the fourth cycle. The fourth-cycle control unit respectively controls the pH value of demineralized water in the fourth-cycle tank 1-26, the liquid flow of the fourth-cycle pump 1-27, and the cooling water flow of the fourth-cycle cooler 1-28, and it is ensured that in the fourth cycle, the pH value is 9.2, the liquid-gas ratio is 0.8 L/m³, and the absorption temperature is 46° C.

The absorbent preparation unit provides a fresh absorbent for the third-cycle tank 1-23 as required. For iron and steel plants, tertiary amines with a low absorption rate but high absorption capacity are mixed with secondary amines with relatively balanced absorption rate and absorption capacity at a ratio of 2.5:1.

The desorption control unit is respectively connected to the reboiler 1-34 and an inlet pipeline of the desorption column 1-38 to independently control the desorption system. The desorption control unit detects the pH value and temperature of the absorbent at the inlet of the desorption column 1-38 and the pH value and temperature of the absorbent at the outlet of the reboiler 1-34 to respectively control the heat load of the reboiler 1-34 and the flow of the rich liquid at the inlet of the desorption column 1-38, and it is ensured that the pH difference between lean and rich liquid inlets and outlets of the desorption system is maintained at 5.7 and can be flexibly adjusted according to the $CO_2$ concentration of the flue gas.

Figure 5:
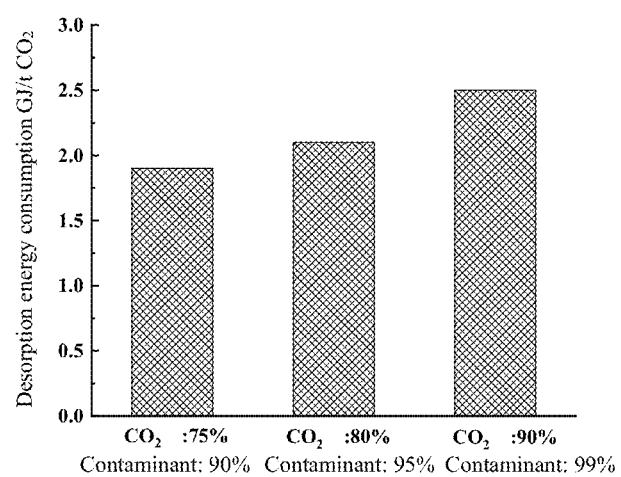
FIG. 5 is a histogram of desorption energy consumption under different removal efficiencies according to Embodiment 3 of the present invention.

FIG. 5 illustrates comparison of desorption energy consumption under different contaminant and $CO_2$ removal efficiencies. The results show that with the continuous improvement of contaminant and $CO_2$ removal efficiency, the required desorption energy consumption is also increased continuously. When the contaminant removal efficiency reaches 99% and the $CO_2$ removal efficiency reaches 90%, the desorption energy consumption is 2.5 GJ/t $CO_2$.

Embodiment 4

In addition to $N_2$ and some 02, flue gas from power plants burning low-sulfur coal also contains about 10% of water vapor, 10-15% of $CO_2$, 300-500 ppm of $SO_2$ and the like.

The first-cycle control unit is respectively connected with the first-cycle tank 1-17, the rich liquid pump 1-18 and the first-cycle cooler 1-19 to independently control the first cycle The first-cycle control unit respectively controls the pH value of the absorption liquid in the first-cycle tank 1-17, the liquid flow of the rich liquid pump 1-18, and the cooling water flow of the first-cycle cooler 1-19, and it is ensured that in the first cycle, the pH value is 4.0, the liquid-gas ratio is 1.0 L/m³, and the absorption temperature is 40° C.

The second-cycle control unit is respectively connected with the second-cycle tank 1-20, the second-cycle pump 1-21 and the second-cycle cooler 1-22 to independently control the second cycle. The second-cycle control unit respectively controls the pH value of the absorption liquid in the second-cycle tank 1-20, the liquid flow of the second-cycle pump 1-21, and the cooling water flow of the second-cycle cooler 1-22, and it is ensured that in the second cycle, the pH value is 7.2, the liquid-gas ratio is 1.8 L/m³, and the absorption temperature is 60° C.

The third-cycle control unit is respectively connected with the third-cycle tank 1-23, the third-cycle pump 1-24 and the third-cycle cooler 1-25 to independently control the third cycle. The third-cycle control unit respectively controls the pH value of the absorption liquid in the third-cycle tank 1-23, the liquid flow of the third-cycle pump 1-24, and the cooling water flow of the third-cycle cooler 1-25, and it is ensured that in the third cycle, the pH value is 8.2, the liquid-gas ratio is 1.6 L/m³, and the absorption temperature is 55° C.

The fourth-cycle control unit is respectively connected with the fourth-cycle tank 1-26, the fourth-cycle pump 1-27 and the fourth-cycle cooler 1-28 to independently control the fourth cycle. The fourth-cycle control unit respectively controls the pH value of demineralized water in the fourth-cycle tank 1-26, the liquid flow of the fourth-cycle pump 1-27, and the cooling water flow of the fourth-cycle cooler 1-28, and it is ensured that in the fourth cycle, the pH value is 8.0, the liquid-gas ratio is 0.4 L/m³, and the absorption temperature is 55° C.

The absorbent preparation unit provides a fresh absorbent for the third-cycle tank 1-23 as required. For power plants burning low-sulfur coal, secondary amines with relatively balanced absorption rate and absorption capacity are mixed with primary amines with a high absorption rate at a ratio of 3:1.

The desorption control unit is respectively connected to the reboiler 1-34 and an inlet pipeline of the desorption column 1-38 to independently control the desorption system.

The desorption control unit detects the pH value and temperature of the absorbent at the inlet of the desorption column 1-38 and the pH value and temperature of the absorbent at the outlet of the reboiler 1-34 to respectively control the heat load of the reboiler 1-34 and the flow of the rich liquid at the inlet of the desorption column 1-38, and it is ensured that the pH difference between lean and rich liquid inlets and outlets of the desorption system is maintained at 4.1.

When the contaminant removal efficiency reaches 95% and the $CO_2$ removal efficiency reaches 90%, the desorption energy consumption is 3.2 GJ/t $CO_2$.

The present invention designs a low-cost and high-efficiency absorption-desorption decoupling method for contaminant-$CO_2$ synergistic capture. According to the method, an optimization model of absorption-desorption decoupling control for contaminant-$CO_2$ synergistic capture under different working conditions is built, the optimization objective is to obtain high-purity liquid contaminants and $CO_2$ at low cost and efficiently, and an adaptive penalty function is constructed to transform a solution of a constrained optimization problem into that of an unconstrained optimization problem, thereby controlling parameters in a real-time, precise and stable manner. Moreover, supported by means of flue gas pre-scrubbing and cooling, multi-stage intercooling and column-top demisting, the method of the present invention achieves efficient capture of contaminants and $CO_2$. The absorption process is decoupled from the desorption process, and the coordinated control of temperature-pH-liquid-gas ratio and rich liquid flow-desorption temperature in all cycles is carried out to realize the synergistic capture-regeneration-concentration of contaminants and $CO_2$ with high efficiency and low energy consumption, thereby reducing the high cost of the traditional method where a flue gas cleaning system and a carbon capture system operate separately.

The preferred embodiments of the present invention have been described in detail above; however, the present invention is not limited thereto. Within the scope of the technical concept of the present invention, various simple variants can be made to the technical solution of the present invention. These variants include combinations of various technical features in any other suitable manner. These simple variants and combinations should also be regarded as the content disclosed in the present invention and all of them should fall within the scope of the present invention.

The invention claimed is:

1. An absorption-desorption decoupling method for contaminant-$CO_2$ synergistic capture, wherein flue gas enters an absorption system which comprises a multi-cycle absorption column, and then enters a first-cycle contaminant absorption section, a second-cycle $CO_2$ absorption section, a third-cycle $CO_2$ absorption section and a fourth-cycle water washing section in sequence after passing through a pre-scrubbing section arranged at a front part of the multi-cycle absorption column; rich liquid enters a desorption system which comprises a desorption column via a lean-rich liquid heat exchanger, and lean liquid goes out of the desorption column and enters the lean-rich liquid heat exchanger; regenerated vapor in the desorption column enters a separation and purification system; the absorption system and the desorption system are respectively controlled by a decoupling control system; the decoupling control system comprises an absorption control unit for the multi-cycle absorption column and a desorption control unit for the desorption column; the absorption control unit comprises a first-cycle control unit, a second-cycle control unit, a third-cycle control unit, a fourth-cycle control unit and an absorbent preparation unit;

the absorption-desorption decoupling method comprises:

(1) decoupling of four cycles in the absorption system, wherein the absorption process is divided into four parts by controlling the four cycles in different areas; a first cycle corresponds to a bottom layer of the multi-cycle absorption column and is configured to absorb contaminants and be independently controlled to ensure the contaminant removal efficiency; a second cycle corresponds to a second layer of the multi-cycle absorption column and is configured to absorb $CO_2$ and be independently controlled to increase the $CO_2$ load of an absorbent; a third cycle corresponds to a third layer of the multi-cycle absorption column and is configured to absorb $CO_2$ and be independently controlled to ensure the $CO_2$ absorption efficiency; a forth cycle corresponds to a top layer of the multi-cycle absorption column and is configured to remove aerosols and be independently controlled to ensure that the emission of flue gas aerosols reaches a preset standard; and (2) decoupling of the absorption system and the desorption system, wherein the multi-cycle absorption is adopted so that the absorption liquid entering the desorption column is in a saturated state, thereby reducing the influence of the absorption process on the desorption;

the absorption-desorption decoupling method specifically comprises the following steps:

(1) building a database based on real-time data and historical data of three-path parameters including cooling water path, absorption liquid path and flue gas path, wherein the parameters include flue gas flow (G), partial pressures ($p_{out}$) and ($p_{in}$) of gas in flue gas, the concentration ($c_{ab}$) of an absorbent, the pH value ($pH_i$), temperature ($T_i$) and flow ($L_i$) of liquid in a cycle, the pH value ($pH_{rich}$), temperature ($T_{rich}$), and flow ($L_{rich}$) of rich liquid entering the desorption column, the pH value ($pH_{lean}$) and temperature ($T_{lean}$) of lean liquid leaving the desorption column, the concentrations, ($c_{pa}$), ($c_{sa}$) and ($c_{ta}$) of primary amine, secondary amine, and tertiary amine in fresh absorption liquid, and the heat load (W) of a reboiler;

(2) building, on the basis of the built database, an optimization model of absorption-desorption decoupling control for contaminant-$CO_2$ synergistic capture under different working conditions; according to an actual operation of the absorption system and the desorption system, setting constraints for adjustment ranges of operating parameters as:

$$\eta_{CO_2} \geq \eta_{set,CO_2}$$

$$\eta_{cont} \geq \eta_{set,cont}$$

$$G_{max} \geq G \geq G_{min}$$

$$p_{in,max} \geq p_{in} \geq p_{in,min}$$

$$c_{ab,max} \geq c_{ab} \geq c_{ab,min}$$

$$pH_{i,max} \geq pH_i \geq pH_{i,min}, \ i \in [1,4]$$

$$T_{i,max} \geq T_i \geq T_{i,min}, \ i \in [1,4]$$

$$L_{i,max} \geq L_i \geq L_{i,min}, \ i \in [1,4]$$

wherein $\eta_{CO_2}$ and $\eta_{set,CO_2}$ represent the removal efficiency and set efficiency of $CO_2$, respectively and $\eta_{cont}$ and $\eta_{set,cont}$ represent the removal efficiency and set efficiency of a contaminant, respectively;

key parameter models for control of the first-cycle control unit, the second-cycle control unit, the third-cycle control unit, the fourth-cycle control unit, the absorbent preparation unit and the desorption control unit are:

$\eta_1{}^{st}=f_{absorbent,cont,1}{}^{st}(pH_1,T_1,L_1)$ $\eta_2{}^{nd}=f_{absorbent,co_2,2}{}^{nd}(pH_2,T_2,L_2)$ $\eta_3{}^{rd}=f_{absorbent,co_2,3}{}^{rd}(pH_3,T_3,L_3)$ $\eta_4{}^{th}=f_{water,4}{}^{th}(pH_4,T_4,L_4)$ $\eta_{absorbent}=f_{absorbent}(c_{pa},c_{sa},c_{ta})$ $\eta_{desorption}=f_{desorption}(L_{rich},W)$ wherein $\eta_1{}^{st}$, $\eta_2{}^{nd}$, $\eta_3{}^{rd}$, $\eta_4{}^{th}$, $\eta_{absorbent}$ and $\eta_{desorption}$ represent efficiencies of the first-cycle control unit, the second-cycle control unit, the third-cycle control unit, the fourth-cycle control unit, the absorbent preparation unit and the desorption control unit, respectively;

adopting following particle fitness function (Fitness) as an objective function of the optimization model and combining constraints of the operating parameters to achieve parameter optimization as follows:

Fitness=$cost_{min}$=$cost_1{}^{st}$+$cost_2{}^{nd}$+$cost_3{}^{rd}$+$cost_4{}^{th}$+$cost_{absorbent}$+$cost_{desorption}$ wherein $cost_1{}^{st}$, $cost_2{}^{nd}$, $cost_3{}^{rd}$, $cost_4{}^{th}$, $cost_{absorbent}$, and $cost_{desorption}$ represent energy and material consumption costs of the first-cycle control unit, the second-cycle control unit, the third-cycle control unit, the fourth-cycle control unit, the absorbent preparation unit and the desorption control unit, respectively;

(3) constructing a penalty function (Penalty) and adding the penalty function (Penalty) to an objective function Fitness(x); transforming a solution of a constrained optimization problem into that of an unconstrained optimization problem through a penalty strategy of the objective function; and using self information and population information obtained during a particle evolution iteration process as feedback conditions to dynamically adjust a penalty coefficient of the particle fitness beyond a feasible range after each iteration;

$x \in [cost_1{}_{st}, cost_2{}_{nd}, cost_3{}_{rd}, cost_4{}_{th}, cost_{absorbent}, cost_{desorption}]$ $Fitness(x) = f(x) \cdot Penalty$ $Penalty = \lambda(t) \cdot G_p$ $G_p = 1 + \varepsilon_1 \cdot \sum_{i=1}^{m} RELU(\eta_i - \eta_{seti})^{\varepsilon_2}$ $\lambda(t) = (\mu \cdot t)^{\alpha}$ $(t+1) = \begin{cases} \frac{1}{\beta_1}\lambda(t), & \text{if case1} \\ \beta_2\lambda(t), & \text{if case2} \\ \lambda(t), & \text{otherwise} \end{cases}$ wherein x represents optimization objective; Penalty represents the penalty function; $\lambda$ represents adaptive factor; $G_p$ represents layered penalty coefficient; $\eta_i$ represents the removal efficiency of a unit that is in operation; $\eta_{seti}$ represents the target efficiency of the unit that is in operation; t represents the number of iterations; $\mu$, $\varepsilon_1$, $\beta_1$ and $\beta_2$ represent scale factors of the penalty function; $\varepsilon_2$ and $\alpha$ represent power factors of the penalty function; RELU (rectified linear unit) represents an activation function judgment module and RELU(x)=max(0, x); $\beta_1 > \beta_2 > 1$; case1 represents a case where all the optimal individuals are feasible solutions in the iteration process; case2 represents a case where there is no feasible solution in optimal individuals during the iteration process; and (4) after obtaining a parameter combination of first-cycle control, second-cycle control, third-cycle control, fourth-cycle control, absorbent preparation and desorption control, with the parameter combination as a control target, carrying out an advanced control method comprising predictive control and fuzzy control to control parameters in real-time, thereby ensuring that the efficiency of absorption-desorption decoupling for contaminant-$CO_2$ synergistic capture reaches the preset standard.

2. The absorption-desorption decoupling method for contaminant-$CO_2$ synergistic capture according to claim 1, wherein the pre-scrubbing section is configured as a Venturi pre-scrubbing section, and the first-cycle contaminant absorption section, the second-cycle $CO_2$ absorption section, the third-cycle $CO_2$ absorption section and the fourth-cycle water washing section are connected in series from bottom to top; the first-cycle contaminant absorption section comprises a first-cycle packing layer, a first-cycle nozzle and a first-cycle liquid catch tray which are arranged in sequence from bottom to top, and the first-cycle contaminant absorption section forms the first cycle through a first-cycle tank, a rich liquid pump, and a first-cycle cooler; the second-cycle $CO_2$ absorption section comprises a second-cycle packing layer, a second-cycle nozzle, and a second-cycle liquid catch tray which are arranged in sequence from bottom to top, and the second-cycle $CO_2$ absorption section forms the second cycle through a second-cycle tank, a second-cycle pump, and a second-cycle cooler; the third-cycle $CO_2$ absorption section comprises a third-cycle packing layer, a third-cycle nozzle, and a third-cycle liquid catch tray which are arranged in sequence from bottom to top, and the third-cycle $CO_2$ absorption section forms the third cycle through a third-cycle tank, a third-cycle pump, and a third-cycle cooler; the fourth-cycle water washing section comprises a fourth-cycle packing layer and a fourth-cycle nozzle which are arranged in sequence from bottom to top, and the fourth-cycle water washing section forms the fourth cycle through a fourth-cycle tank, a fourth-cycle pump, and a fourth-cycle cooler; and an absorption column demister is arranged at the top of the multi-cycle absorption column;

the Venturi pre-scrubbing section is arranged at the front part of the multi-cycle absorption column and comprises an inlet pipe, a necking pipe, a throat pipe and a diffuser pipe which are connected in sequence, a pre-scrubbing nozzle is arranged at the necking pipe, a flue gas outlet is arranged at a tail end of the diffuser pipe, the bottom of the diffuser pipe leads to a pre-scrubber water tank, and demineralized water is sprayed by the pre-scrubbing nozzle through a pre-scrubbing pump.

3. The absorption-desorption decoupling method for contaminant-$CO_2$ synergistic capture according to claim 2, wherein an ion exchanger is arranged downstream of a lean liquid section of the lean-rich liquid heat exchanger and filled with an ion exchange resin; the third-cycle tank and the second-cycle tank are both configured as overflow liquid storage tanks arranged in steps from top to bottom; the fourth-cycle tank, third-cycle tank, the second-cycle tank, and the first-cycle tank are each equipped with an online pH detector; wherein the fourth-cycle tank is configured as a demineralized water storage tank; the third-cycle tank is configured as an absorbent liquid storage tank, and when a liquid level rises to a maximum level, the liquid overflows to the second-cycle tank; the second-cycle tank is configured as an absorbent liquid storage tank, and when a liquid level rises to a maximum level, the liquid overflows to the first-cycle tank;

the fourth-cycle pump, the third-cycle pump, the second-cycle pump, and the rich liquid pump are all configured as variable-frequency pumps;

cooling water of the first-cycle cooler, the second-cycle cooler, the third-cycle cooler and the fourth-cycle cooler comes from a demineralized water tank, and the cooling water after heat exchange supplements feed water of a heating boiler; cooling water sides of the first-cycle cooler, the second-cycle cooler, the third-cycle cooler, and the fourth-cycle cooler are equipped with corresponding heat-conduction flow controllers, and absorption liquid sides of the first-cycle cooler, the second-cycle cooler, and the third-cycle cooler and a demineralized water side of the fourth-cycle cooler are equipped with corresponding temperature sensors.

4. The absorption-desorption decoupling method for contaminant-$CO_2$ synergistic capture according to claim 3, wherein the first-cycle liquid catch tray, the second-cycle liquid catch tray and the third-section liquid catch tray are all configured as liquid catch trays, each comprising V-shaped diversion grooves, vent holes and partitions; a separator is spliced by two semi-elliptical plates, and a dihedral angle formed by the two semi-elliptical plates is 160°; a plurality of vent holes are provided and respectively arranged on two sides parallel to an intersection line of two planes of the two semi-elliptical plates, 5 groups of the vent holes on each side; a V-shaped diversion groove is arranged above each group of vent holes; two ends of the bottom of the V-shaped diversion groove are both welded to support columns on one of the vent holes in each group of the vent holes; two planes of the V-shaped diversion groove form a dihedral angle of 120° and barriers under edges of the V-shaped diversion groove prevent liquid from flowing back into the vent holes.

5. The absorption-desorption decoupling method for contaminant-$CO_2$ synergistic capture according to claim 3, wherein the desorption column comprises a reboiler, a desorption column packing layer, and a desorption column nozzle which are arranged in sequence from bottom to top, and a desorption column demister is arranged at the top of the desorption column;

the reboiler is configured as a vertical tube-side thermosiphon reboiler which comprises a heat collecting tube plate and a middle machine body; the heat collecting tube is installed and fixed on an inner side of the middle machine body;

a liquid baffle and an overflow plate are arranged at the bottom of the desorption column, the liquid baffle is arranged above the overflow plate and fixed on a column wall, and an upper edge of the overflow plate is higher than the heat collecting tube of the reboiler;

a multi-cycle absorption column is connected to the desorption column through the lean-rich liquid heat exchanger; the lean-rich liquid heat exchanger is configured as a spiral plate heat exchanger; the rich liquid in the first-cycle tank of the multi-cycle absorption column passes through the rich liquid pump and enters the lean-rich liquid heat exchanger for heat exchange, and then communicates with the desorption column nozzle of the desorption column; the lean liquid at the bottom of the desorption column passes through a lean liquid pump and enters the lean-rich liquid heat exchanger for heat exchange, then enters the ion exchanger for ion exchange, and then communicates with the third-cycle cooler to enter the third cycle; the lean liquid pump is configured as a variable-frequency pump.

6. The absorption-desorption decoupling method for contaminant-$CO_2$ synergistic capture according to claim 1, wherein the separation and purification system comprises a cooler, a first gas-liquid separator and a second gas-liquid separator, and the cooler, the first gas-liquid separator and the second gas-liquid separator are connected in sequence; cooling water of the cooler comes from a demineralized water tank; the first gas-liquid separator separates water vapor from the flue gas, cooled flue gas from the cooler enters the first gas-liquid separator, condensed water flows back into the desorption column from the bottom of the first gas-liquid separator, and the flue gas after the separation leaves from the top of the first gas-liquid separator; the second gas-liquid separator separates contaminants and $CO_2$ in the flue gas, and the second gas-liquid separator uses a cooling medium to reduce the temperature of the flue gas to below the boiling point of the contaminants; the condensed contaminants in the flue gas are recovered from the bottom of the second gas-liquid separator, and $CO_2$ gas is recovered from the top of the second gas-liquid separator.

7. The absorption-desorption decoupling method for contaminant-$CO_2$ synergistic capture according to claim 2, wherein the first-cycle control unit is respectively connected with the first-cycle tank, the rich liquid pump and the first-cycle cooler to independently control the first cycle; the first-cycle control unit respectively controls the pH value of the absorption liquid in the first-cycle tank, the liquid flow of the rich liquid pump, and the cooling water flow of the first-cycle cooler; in the first cycle, the pH value is maintained between 4.5 and 5.8, the liquid-gas ratio is maintained between 1.5 $L/m^3$ and 2.0 $L/m^3$, and the absorption temperature is maintained between 48° C. and 60° C.;

the second-cycle control unit is respectively connected with the second-cycle tank, the second-cycle pump and the second-cycle cooler to independently control the second cycle; the second-cycle control unit respectively controls the pH value of the absorption liquid in the second-cycle tank, the liquid flow of the second-cycle pump, and the cooling water flow of the second-cycle cooler; in the second cycle, the pH value is maintained between 7.8 and 9.0, the liquid-gas ratio is maintained between 1.1 $L/m^3$ and 1.4 $L/m^3$, and the absorption temperature is maintained between 44° C. and 55° C.;

the third-cycle control unit is respectively connected with the third-cycle tank, the third-cycle pump and the third-cycle cooler to independently control the third cycle; the third-cycle control unit respectively controls the pH value of the absorption liquid in the third-cycle tank, the liquid flow of the third-cycle pump, and the cooling water flow of the third-cycle cooler; in the third cycle, the pH value is maintained between 9.0 and 10.5, the liquid-gas ratio is maintained between 1.0 $L/m^3$ and 1.3 $L/m^3$, and the absorption temperature is maintained between 40° C. and 50° C.;

the fourth-cycle control unit is respectively connected with the fourth-cycle tank, the fourth-cycle pump and the fourth-cycle cooler to independently control the fourth cycle; the fourth-cycle control unit respectively controls the pH value of demineralized water in the fourth-cycle tank, the liquid flow of the fourth-cycle pump, and the cooling water flow of the fourth-cycle cooler; in the fourth cycle, the pH value is maintained between 8.5 and 9.8, the liquid-gas ratio is maintained between 0.6 $L/m^3$ and 1.0 $L/m^3$, and the absorption temperature is maintained between 40° C. and 50° C.

8. The absorption-desorption decoupling method for contaminant-$CO_2$ synergistic capture according to claim 2, wherein the absorbent preparation unit provides a fresh absorbent for the third-cycle tank, and adjusts a mixing ratio of primary amines, secondary amines, and tertiary amines to match the absorption process according to the requirements for absorption capacity and absorption rate.

9. The absorption-desorption decoupling method for contaminant-$CO_2$ synergistic capture according to claim 5, wherein the desorption control unit is respectively connected to the reboiler and an inlet pipeline of the desorption column to independently control the desorption system; the desorption control unit detects the pH value and temperature of the absorbent at the inlet of the desorption column and the pH value and temperature of the absorbent at the outlet of the reboiler to respectively control the heat load of the reboiler and the flow of the rich liquid at the inlet of the desorption column, and the pH difference between lean and rich liquid inlets and outlets of the desorption system is maintained between 4.8 and 5.8.

* * * * *